United States Patent
Berger et al.

(10) Patent No.: US 9,600,941 B2
(45) Date of Patent: Mar. 21, 2017

(54) METHOD AND ARRANGEMENT FOR TRANSPORTING CUBOIDAL ITEMS

(71) Applicants: SIEMENS AKTIENGESELLSCHAFT, Munich (DE); DEUTSCHE POST AG, Bonn (DE)

(72) Inventors: Gisbert Berger, Berlin (DE); Thomas Breuer, Constance (DE); Bernd Hartmann, Grafschaft-Leimersdorf (DE); Andreas Marschner, Bonn (DE); Thomas Schoellhorn, Reichenau (DE); Michael Zettler, Allensbach (DE)

(73) Assignees: Siemens Aktiengesellschaft, Munich (DE); Deutsche Post AG, Bonn (DE)

( * ) Notice: Subject to any disclaimer, the term of this patent is extended or adjusted under 35 U.S.C. 154(b) by 124 days.

(21) Appl. No.: 14/423,296

(22) PCT Filed: Aug. 13, 2013

(86) PCT No.: PCT/EP2013/066866
§ 371 (c)(1),
(2) Date: Feb. 23, 2015

(87) PCT Pub. No.: WO2014/029660
PCT Pub. Date: Feb. 27, 2014

(65) Prior Publication Data
US 2015/0254906 A1    Sep. 10, 2015

(30) Foreign Application Priority Data

Aug. 22, 2012  (DE) .................. 10 2012 214 946

(51) Int. Cl.
*G06K 9/00*   (2006.01)
*G07B 17/00*  (2006.01)
(Continued)

(52) U.S. Cl.
CPC .......... *G07B 17/00661* (2013.01); *B07C 3/00* (2013.01); *G06F 17/3028* (2013.01);
(Continued)

(58) Field of Classification Search
CPC .... B07C 3/14; B07C 3/20; B07C 3/00; G06K 9/033; G06K 9/6201; G06K 9/183; G06K 9/4652; G06K 9/4604; G07B 17/00661; G07B 2017/00709; G06F 17/3028
See application file for complete search history.

(56) References Cited

U.S. PATENT DOCUMENTS 7,720,256 B2   5/2010  Desprez et al.
8,467,569 B2   6/2013  Berger et al.
(Continued)

FOREIGN PATENT DOCUMENTS

DE   102004016548 A1   10/2005
DE   102006059525 B3    4/2008
(Continued)

*Primary Examiner* — Amir Alavi
(74) *Attorney, Agent, or Firm* — Laurence Greenberg; Werner Stemer; Ralph Locher

(57) ABSTRACT

An image, which can be analyzed by a computer and shows at least one face of an item, is generated for an item that is to be transported at a predefined time. By automatic analysis of the image, the arrangement determines, for at least one of a plurality of predetermined optically detectable features, the value of the feature for the image of the item. The identification feature value vector generated is automatically compared with stored registration feature value vectors. A record for a particular item contains six registration feature value vectors and each of the six registration feature value vectors specifies a value for each predefined optically detectable feature for each one of six faces of the item. When the identification feature value vector matches a stored registration feature value vector with sufficient accuracy, a message is generated.

18 Claims, 5 Drawing Sheets

(51) Int. Cl.
  *B07C 3/00* (2006.01)
  *G06F 17/30* (2006.01)
  *G06K 9/18* (2006.01)
  *G06K 9/46* (2006.01)
  *G06K 9/62* (2006.01)

(52) U.S. Cl.
  CPC ........... *G06K 9/183* (2013.01); *G06K 9/4604* (2013.01); *G06K 9/4652* (2013.01); *G06K 9/6201* (2013.01); *G07B 2017/00709* (2013.01)

(56) References Cited

U.S. PATENT DOCUMENTS

| | | | |
|---|---|---|---|
| 8,706,290 B2 | 4/2014 | Zettler | |
| 9,020,634 B2* | 4/2015 | Bailey | B07C 3/00 209/584 |
| 9,192,965 B2* | 11/2015 | Serjeantson | B07C 3/08 |
| 2009/0074543 A1 | 3/2009 | Berger et al. | |
| 2010/0023490 A1 | 1/2010 | Wilke | |
| 2014/0263138 A1* | 9/2014 | Koch | A47B 47/0075 211/195 |
| 2015/0254906 A1* | 9/2015 | Berger | B07C 3/00 382/101 |

FOREIGN PATENT DOCUMENTS

| | | |
|---|---|---|
| DE | 102008017185 A1 | 3/2009 |
| DE | 102008026088 A1 | 12/2009 |
| DE | 102009024195 A1 | 12/2010 |
| DE | 102010013220 A1 | 9/2011 |
| EP | 2371461 A1 | 10/2011 |
| FR | 2841673 A1 | 1/2004 |
| WO | 2010142625 A1 | 12/2010 |

* cited by examiner

METHOD AND ARRANGEMENT FOR TRANSPORTING CUBOIDAL ITEMS

BACKGROUND OF THE INVENTION

Field of the Invention

The invention relates to a method and an arrangement for transporting a plurality of cuboidal items, for example mail packages, to prescribed destinations.

Mail packages are frequently transported in vehicles, for example in order to deliver the mail packages to various recipients.

Mail packages can be assigned to a particular vehicle at a sorting installation or in a temporary store, for example. A person or an automaton then loads the cargo space of the vehicle with the assigned mail packages. By way of example, the cargo space may contain a large number of slots, each of which can have a mail package put into it. The slots may also be part of a full-wall shelf that can be loaded outside the vehicle and then slid into the vehicle. The allocation may be arbitrary or based on an allocation scheme that prescribes the slot into which a mail package should be put.

A delivery driver drives the loaded vehicle to a plurality of destinations in succession along a route that is prescribed to him. At each destination, at least one mail package needs to be removed from the vehicle each time and if possible delivered. To this end, at each destination, the delivery driver needs to find all the mail packages in the cargo space that need to be delivered at this destination.

By way of example, each mail package has been provided with a flag for the postal recipient address by the sender or a mail package carrier, and usually the flag is at least also present in a form that can be read by a human being. However, it is possible for mail packages to be stored in the delivery space of the vehicle during loading such that the flag on the mail package is not visible in this position. This can occur for reasons of space, inter alia, since a mail package possibly fits into particular slots only with a particular orientation. The delivery driver may thus need to rotate the mail package in order to be able to explicitly establish whether it needs to be delivered at the current destination.

A similar problem can arise at other points on the transport path at which the mail packages are temporarily accommodated. A similar problem can also arise with any other cuboidal items that either have no identifying statement applied to them or have an identifying statement applied to them only on a restricted number of sides.

BRIEF SUMMARY OF THE INVENTION

One of the objects of the invention is to provide a method for transporting a plurality of cuboidal items and also an arrangement, an apparatus, a program and a computer program product for controlling such a method of transport, wherein an item can be found without the need for the item to be rotated such that an identifying statement relating to the item becomes visible. It goes without saying that in this context cuboidal is intended to be understood not as ideally cuboidal but rather as essentially cuboidal.

An exemplary method according to the invention for transporting a plurality of cuboidal items to prescribed destinations comprises, for at least one item to be transported, production of at least one computer-evaluable depiction of the item to be transported, said depiction showing at least one surface of the item. Automatic image evaluation of said depiction ascertains, for at least one of a plurality of prescribed visually detectable features, what value said feature assumes for said depiction of the item. The identification feature value vector produced by image evaluation of the depiction of the item is automatically compared with stored registration feature value vectors, wherein said stored registration feature value vectors used for the comparison belong to data records from a plurality of items, wherein a data record for a respective item comprises six registration feature value vectors and wherein each of the six registration feature value vectors indicates a value for each prescribed visually detectable feature for a respective one of six surfaces of the item. If the identification feature value vector matches a stored registration feature value vector with sufficient accuracy, a message is generated, wherein said message comprises a piece of information about that item to which the data record with the stored registration feature value vector recognized as matching belongs, and wherein the message can be used for the further transport of said item.

An exemplary arrangement according to the invention for controlling a method for transporting a plurality of cuboidal items to prescribed destinations comprises an image recording appliance that is designed to produce a computer-evaluable depiction of an item to be transported, at least once. The arrangement additionally comprises an identification image evaluation unit that is designed to ascertain, by means of automatic image evaluation of a depiction of an item, for at least one of a plurality of prescribed visual features, what value said feature assumes for said depiction of the item, and to automatically compare an identification feature value vector produced by automatic image evaluation of a depiction of an item with stored feature value vectors, wherein said stored registration feature value vectors used for the comparison belong to data records from items, wherein a data record for a respective item comprises six registration feature value vectors and wherein each of the six registration feature value vectors indicates a value for each prescribed visually detectable feature for a respective one of six surfaces of the item. The arrangement additionally comprises a message generation appliance that is designed so that, if the identification feature value vector matches a stored registration feature value vector with sufficient accuracy, it generates a message that comprises a piece of information about that item to which the data record with the stored registration feature value vector recognized as matching belongs.

The at least one computer-evaluable depiction of an item can be produced at any location at which a message with information about the item may be of benefit for the further transport of the item, for example in the cargo space of a delivery vehicle or in a buffer store. By way of example, the registration feature value vectors used for the comparison could then belong to data records from a plurality of items that have been put into the cargo space, or to data records from a plurality of items that are in the buffer store.

In one exemplary embodiment, a plurality of cuboidal items are transported. For each item, a respective destination to which said item needs to be transported is prescribed. In the case of a mail package as an item that needs to be transported, a postal address is prescribed as destination, for example. Each cuboidal item has six rectangular surfaces.

By way of example, the following steps are performed for each item to be transported:

The item passes through an image recording station once.

The item is then put into a cargo space in a delivery vehicle.

The item is transported to the destination prescribed for this item using the delivery vehicle.

Another exemplary embodiment provided is an arrangement that is designed to control a method of transport having these method steps.

In one exemplary embodiment, a plurality of visually detectable features are prescribed. The values of said features can be calculated by automatic image evaluation.

For each item to be transported, one exemplary embodiment additionally involves the following steps being performed:

The image recording station automatically produces a respective computer-evaluable depiction of each surface of the cuboidal item passing through. In total, the image recording station thus produces six depictions of an item passing through.

For each surface of the item and for each prescribed visually detectable feature, a registration image evaluation unit automatically ascertains what value said feature assumes for said surface. In this case, the registration image evaluation unit evaluates the depiction of said surface of the item. In total, this generates six registration feature value vectors for the six surfaces of the item.

A data record is produced for the item and is stored in a data memory. Said data record comprises the six registration feature value vectors.

For at least one item to be transported in the cargo space, on exemplary embodiment additionally involves the following steps being performed:

An image recording appliance produces at least one computer-evaluable depiction of the item to be transported, at least once while said item is in the cargo space. Said depiction shows at least one surface of the item to be transported.

For at least one prescribed visually detectable feature, an identification image evaluation unit ascertains what value said feature assumes for the surface of the item that is shown in the depiction.

The identification image evaluation unit automatically compares the identification feature value vector for one surface of the item with stored registration feature value vectors. Each registration feature value vector used for the comparison describes one surface of an item in the cargo space and therefore belongs to a stored data record for an item that has been put into the cargo space.

If the identification feature value vector matches a stored registration feature value vector with sufficient accuracy, a message is produced. This automatically produced message comprises a piece of information about that item to which the data record with the stored registration feature value vector recognized as matching belongs.

Said message is used for the further transport of that item from which the depiction with the sufficiently accurately matching identification feature value vector originates.

According to some exemplary embodiments, the cuboidal item may be in any orientation in the cargo space. The depiction of the item in the cargo space does not necessarily need to show a flag for the destination or an explicit identifier for the item. Nevertheless, in these exemplary embodiments, the message about a particular item can be generated.

It is not necessary for an item to be put into a particular position in the cargo space in order to produce a depiction of said item. In addition, it is not necessary for a depiction of an item in the cargo space to be produced such that evaluation of the depiction makes it possible to ascertain, for each prescribed visually detectable feature, what value said feature assumes for the surface shown.

In one exemplary embodiment, a depiction from the image recording station or from the image recording appliance shows a plurality of surfaces of a cuboidal item or shows a plurality of cuboidal items. At least in this case, edges are spotted in the depiction, and the depiction is broken down into depiction elements by computer on the basis of the edges spotted. Each depiction element produced in this manner is conditioned. Each conditioned depiction element shows a rectangular surface from a directional view that is perpendicular to the surface. Said conditioned depiction element is evaluated in order to ascertain the feature values for said surface.

In one exemplary embodiment, each data record for an item to be transported comprises, in addition to the six registration feature value vectors, a coding for a destination to which said item is to be transported. In one exemplary embodiment, the generated message for an item comprises a flag for said destination, e.g. in a form that can be detected by a human being. In another exemplary embodiment, the current geoposition of the vehicle is measured at least once. The destination to which an item in the cargo space is to be transported is compared with said current geoposition. The generated message comprises the information concerning whether the destination of the item matches the measured geoposition—within a prescribed tolerance.

In one exemplary embodiment, the identification image evaluation unit is carried together with the image recording appliance onboard the delivery vehicle. By way of example, the identification image evaluation unit and the image recording appliance form two parts of a mobile appliance, e.g. a Smartphone. This embodiment dispenses with the need for data to be transmitted wirelessly to and fro between the image recording appliance and the identification image evaluation unit. In another exemplary embodiment, the identification image evaluation unit is part of a fixed device outside the delivery vehicle, e.g. part of a sorting center for sorting items to be transported. The image recording appliance wirelessly transmits depictions of items in the cargo space to said fixed identification image evaluation unit. The identification image evaluation unit transmits image evaluation results back to the image recording appliance onboard the delivery vehicle. This embodiment allows a more lightweight image recording appliance. Furthermore, image evaluation units are dispensed with, since the same identification image evaluation unit can be connected wirelessly to a plurality of image recording appliances, even to a plurality of image recording appliances onboard a plurality of delivery vehicles.

In one exemplary embodiment, the items are first of all put into a buffer store and from there are put into the cargo space of the delivery vehicle—or distributed to the cargo spaces of various delivery vehicles. Those steps that are performed by the image recording appliance and/or by the identification image evaluation unit in exemplary embodiments are additionally performed for at least one item in the buffer store—or just for at least one item in the buffer store and not for an item in the cargo space. A message for an item in the buffer store is generated and output. This message is used to control the process of putting each item to be transported into a cargo space. By way of example, the output message specifies a particular delivery vehicle or a slot in the cargo space of a delivery vehicle.

In one exemplary embodiment, the stored registration feature value vectors comprise only registration feature value vectors for items that have been put into a vehicle or temporary store according to schedule. This minimizes the memory space required. This may be of particular advantage where the registration feature value vectors are stored in the vehicle or in a mobile appliance associated with the vehicle. Another location, for example a central server, may simultaneously store registration feature value vectors for items that need to be put into a large number of vehicles according to schedule. In a further exemplary embodiment, the stored registration feature value vectors comprise only registration feature value vectors for items that have been put into a vehicle or a temporary store according to a user input. In this case, the same advantage is obtained as in the previously cited embodiment. In addition, this ensures that deviations from a schedule can be taken into account. In a further exemplary embodiment, the stored registration feature value vectors comprise only registration feature value vectors for items that are intended to be delivered according to schedule on a route that is to be taken by a vehicle and on at least one adjacent route. In this case too, the advantage is obtained that required memory space is kept low. However, in this case, even without a user input, it is possible to ensure that there is high probability of registration feature value vectors being existent for all items in the vehicle even if the vehicle contains an item that, according to schedule, should be delivered by another vehicle taking a neighboring route. In a further exemplary embodiment, the stored registration feature value vectors are each reduced by registration feature value vectors for the items that have been removed from a vehicle or a temporary store finally on the basis of a user input. This allows a reduction in the number of comparisons to be performed.

By way of example, a stored statement linked to a registration feature value vector may be present once in a data record that contains all the stored registration feature value vectors for an item. A registration feature value vector may be linked to a stored statement or to a plurality of stored statements. By way of example, the statements may comprise a piece of destination information. Such a piece of destination information may comprise an address or coordinates, for example, or an identifier from which it is possible to ascertain a particular address or coordinates using a database. The statements may also comprise special specifications for the delivery of an item. They may also comprise an identification for a vehicle, for a buffer store or for a route. They may also comprise a delivery status for an item. They may additionally comprise any other statements.

In a further exemplary embodiment, each stored registration feature value vector is linked to a stored statement regarding the vehicle or temporary store that contains an associated item according to schedule, wherein only stored registration feature value vectors for items that are in the vehicle or temporary store according to schedule are taken into account for the comparison. This can have the advantage that even if registration feature value vectors for items to be transported in a large number of vehicles or to be stored in a large number of buffer stores are stored it is possible to minimize the comparison of the registration feature value vectors themselves. In one exemplary embodiment, each stored registration feature value vector is linked to a stored statement regarding the route on which the associated item is intended to be delivered according to schedule, wherein only stored registration feature value vectors for items that are intended to be delivered on a prescribed route or on an adjacent route according to schedule are taken into account for the comparison. This can have the advantage that the number of comparisons to be performed for the registration feature value vectors can be kept low, while at the same time it is possible to take account of the fact that items are delivered to and fro using a substitute vehicle or using other vehicles that take an adjacent route. In one exemplary embodiment, each stored registration feature value vector can be linked to a stored statement that the associated item has been removed from a vehicle or a temporary store finally, wherein only stored registration feature value vectors for items that are not linked to such a statement are taken into account for the comparison. This allows a reduction in the number of comparisons to be performed by virtue of the stored registration feature value vectors that are linked to a corresponding statement being ignored. In one exemplary embodiment, each stored registration feature value vector is linked to a stored statement regarding the destination at which the associated item is intended to be delivered according to schedule, wherein only stored registration feature value vectors for items that, according to the stored statement, are intended to be delivered within a prescribed radius around a current position of the vehicle and/or around a scheduled route of the vehicle are taken into account for the comparison. This likewise allows a reduction in the number of comparisons to be performed.

When the number of comparisons to be performed is reduced, it is generally possible to save processor power and/or to speed up the output of a result to a user. Both can also lead to a reduction in the energy required.

An exemplary program according to the invention comprises program instructions, wherein the program instructions prompt an apparatus to carry out a method when the program is executed by a processor, said method comprising the following actions: reception of image data from at least one depiction produced for a cuboidal item; creation of an identification feature value vector from at least one value of at least one feature using the image data, wherein the at least one feature represents a visually detectable property of a surface of a cuboidal item; comparison of the identification feature value vector created with stored registration feature value vectors, wherein registration feature value vectors are stored for a plurality of cuboidal items and wherein, for each cuboidal item, a respective registration feature value vector is stored for each of six different surfaces of the cuboidal item; and, at least if a stored registration feature value vector with a prescribed degree of match with the created identification feature value vector is found in the comparison, prompting of output of a message, particularly to a user, on the basis of a stored statement linked to the registration feature value vector found, wherein the message can be used for the further transport of the item. Such a method can also be regarded as an exemplary embodiment of the invention. By way of example, a program can be distributed via a network, such as a local area network, a wide area network, a virtual network, a radio network, such as a mobile radio network, another telephone network and/or the internet. At least part of a program may be software and/or firmware for a processor. By way of example, the program according to the invention is stored in a memory of the apparatus according to the invention. It goes without saying that the term program can also be understood in each case to mean a compilation of a plurality of programs.

An exemplary storage medium according to the invention stores the program according to the invention. The storage medium is a computer-readable storage medium that contains the program according to the invention and, by way of example, is in the form of a magnetic, electrical, electromagnetic, optical and/or other kind of storage medium. The storage medium may be particularly a physical and/or material storage medium. The storage medium is portable or permanently installed in an apparatus, for example. In particular, "computer-readable" is intended to be understood to mean that the storage medium can be read and/or written to by a computer or a data processing apparatus, for example by a processor. By way of example, the storage medium is a program memory of a processor.

An exemplary apparatus according to the invention comprises at least one processor and at least one memory, wherein the memory stores a program, and wherein the memory and the program are set up to prompt, with the processor, the apparatus at least to perform the actions cited above in connection with the program when the program is executed on the processor. By way of example, the apparatus is set up in terms of software to be able to perform the actions. In this case, set up in terms of software is intended to be understood to mean particularly the preparation of the apparatus that is required in order to be able to carry out a method, for example in the form of a program, on the processor.

A processor is intended to be understood to mean, inter alia, one or more control units, microprocessors, microcontrol units, such as microcontrollers, digital signal processors (DSP), application-specific integrated circuits (ASIC) or field programmable gate arrays (FPGA).

By way of example, a memory is a program memory and/or a main memory of the processor. A program memory is intended to be understood to mean, inter alia, a nonvolatile memory, and a main memory is intended to be understood to mean a volatile or a nonvolatile memory, particularly a random access memory (RAM) and/or a flash memory. By way of example, nonvolatile memories are random access memories (RAM), such as NOR flash memories, or sequential access memories, such as NAND flash memories, and/or read only memories (ROM), such as EPROM, EEPROM or ROM memories. The memory may be in material form, for example.

An exemplary procedure that a delivery driver of a package carrier partly performs himself and partly observes is first of all described below for an exemplary embodiment.

A large number of mail packages are buffer-stored in a buffer and a sorting center or a delivery base. These packages are then distributed to delivery vehicles or all put into the same delivery vehicle. An image recording appliance produces a respective depiction of each package in said buffer. For each package, a worker putting the packages into the delivery vehicle is sent a respective prompt regarding the vehicle and possibly the slot in said vehicle into which said package needs to be put.

The cargo space of a delivery vehicle is loaded with mail packages. Each package needs to be delivered to the respectively prescribed recipient and has been provided with a flag for the postal recipient address in a form that can be read by a human being by the sender or by the package carrier. A worker loads packages into said cargo space. The cargo space contains a large number of slots. In one exemplary embodiment, each slot in the cargo space has an explicit identifier that distinguishes said slot from all the other slots in said cargo space.

In one exemplary embodiment, the worker himself selects a suitable slot for the package.

In another exemplary embodiment, which is described in WO 2010/142625 A1, for example, a respective intended slot in the cargo space is prescribed to a worker for each package. Alternatively, the worker can place the package into another slot, for example because the prescribed intended slot is unavailable or is unsuitable for the package. By way of example, the worker uses voice input to input that slot into which the worker has actually placed the package.

A delivery driver drives the delivery vehicle to a plurality of destinations in succession along a delivery route that is prescribed to him. At each destination, at least one package needs to be removed from the delivery vehicle each time and delivered to the recipient. The delivery driver has to find all the packages to this destination in the cargo space.

Most mail packages are in the form of a cuboid. It is possible for a package to be situated in the vehicle such that the address on the package is not visible in this position. Nevertheless, the aim is to prevent the delivery driver from having to lift and rotate packages in order to find the packages for a particular destination in the cargo space. This step of rotation would take up a lot of time during the delivery. The delivery driver would often need to lift and rotate the same package repeatedly until the destination for said package has been reached.

Onboard the vehicle, there is a mobile data-processing appliance with an image recording appliance. This mobile appliance is embodied as a Smartphone, for example.

In one exemplary embodiment, the following sequence is performed at least once:
  The driver uses a mobile data-processing appliance, e.g. a Smartphone, to produce a depiction of a package that is in the cargo space. Said depiction at least partly shows at least one surface of the package and not necessarily the post or recipient address on the package.
  The appliance itself or another image evaluation unit automatically evaluates the depiction and produces a prompt to the delivery driver, e.g. one of the following prompts: "Deliver package here" or "Take shot of another package" or "Delivery at this destination is complete".
  In an alternative exemplary embodiment, the appliance outputs a description of the ascertained destination in a form that is perceivable to a human being, e.g. as an alphanumeric character string or by virtue of the destination being shown on a map or by voice output.

This sequence is repeated until the delivery driver has delivered all packages to this destination—or at least has attempted to do so.

In another exemplary embodiment, the mobile appliance produces depictions of packages in the cargo space without the assistance of the delivery driver. The mobile appliance produces depictions automatically, e.g. at a prescribed shot frequency.

In one exemplary embodiment, the mobile appliance is mounted in a bracket in the cargo space. In a development of this embodiment, a plurality of mobile appliances are mounted on different brackets in the cargo space and produce depictions in different directions.

In another exemplary embodiment, at least one mobile appliance is guided past the packages along a guide device. By way of example, the mobile appliance is conveyed at constant speed by a drive of the guide device. A mobile appliance in a bracket can be used in combination with a mobile appliance on a guide device.

In one exemplary embodiment, the mobile appliance outputs a flag for the destination to which a particular package is to be delivered. Alternatively, the mobile appliance outputs the flags of all slots that contain packages for the current destination. Alternatively, the mobile appliance actuates signal lamps on said slots.

In one exemplary embodiment, the delivery driver first of all removes those packages from the cargo space from which the delivery driver knows that said packages need to be delivered to the current destination, e.g. because the delivery driver can read the respective destination flag without rotating the package. The depictions from the mobile appliance are used to find further packages to this current destination in the cargo space.

In one exemplary embodiment, the delivery driver confirms that he has removed a particular package from the cargo space and delivered it to the recipient. If the delivery driver has not been able to deliver the package, the delivery driver puts the package back into the cargo space.

An exemplary internal procedure that an exemplary data-processing arrangement for sorting mail packages performs will now be described for the exemplary application.

On the path from the sender to the recipient, each package to be transported has passed through a package sorting installation ("hub") and then a delivery base at least once before it reaches the delivery vehicle.

A fixed image recording station in the sorting installation produces a respective computer-accessible depiction of each surface of the package. By way of example, an arrangement having four cameras produces four depictions of the package, namely a depiction from above, a depiction from below and two depictions from two different lateral viewing directions. These four depictions are conditioned by computer. In the case of a cuboidal package, said conditioning delivers six depictions of the six surfaces of the cuboid. Each conditioned depiction shows a rectangular surface from a viewing direction that is perpendicular to said surface.

One of said six depictions shows a flag for the destination in a form that can be read by a human being or in machine-readable form or else an explicit identifier for the package. Image evaluation, e.g. by OCR, ascertains the destination flag that is shown in the depiction. If the depiction shows an identifier for the package, said identifier is deciphered. A database query delivers a coding for the destination that has been stored together with the identifier in a data record.

For each surface of the package, a respective registration fingerprint vector is generated, for which the depiction of said surface is evaluated and the values of different prescribed visually detectable features are measured. Said registration fingerprint vector describes said surface of the package. For a cuboidal package, six registration fingerprint vectors are generated as a result, the registration fingerprint vectors for a package are stored in a data memory as a part of a data record for said package. Said data memory belongs to a central database and/or to the mobile data-processing appliance. The depictions themselves are not necessarily stored on a permanent basis. A registration fingerprint for a depiction requires significantly less memory space than the depiction itself.

EP 2371461 A1 describes how, for a flat mail item, a registration feature value vector is generated that describes that surface of the mail item that shows the delivery address.

A prescribed distribution schedule stipulates what packages are being delivered on the current day (in the ongoing "production cycle") by which delivery vehicle, and are therefore put into said vehicle. Therefore, it is known what packages are in a particular delivery vehicle at the beginning of a delivery trip. Preferably, consolidation is performed for the registration fingerprint vectors of all packages in a particular vehicle. In this case, the registration fingerprint vectors are automatically compared with one another, and those features that are best suited to distinguishing (discriminating) the packages in the cargo space are ascertained. This prompts a kind of main component analysis to be performed.

In one exemplary embodiment, a respective data record is created for each sorted package in a central data memory while the package is passing through the sorting installation. Said data record comprises the six registration feature value vectors and additionally a coding for the ascertained destination.

In one refinement of the exemplary embodiment, the data records for those packages that are delivered by means of a particular delivery vehicle are transmitted to the mobile appliance that is carried with said delivery vehicle during delivery. In one embodiment, the data records for packages that need to be delivered to delivery points along at least one adjacent delivery route are additionally likewise transmitted to the mobile appliance. As a result, packages are found even when the actual loading and delivery of the packages differs from scheduled loading and delivery.

In the exemplary embodiment, the mobile appliance registers which packages have been removed from the cargo space, e.g. on the basis of corresponding inputs by the delivery driver. The mobile appliance therefore "knows" that at each instant which packages are currently still in the cargo space.

The mobile appliance—or a position measuring appliance connected to the mobile appliance—measures the current geoposition of the delivery vehicle. Said current geoposition is compared with destinations of packages in the cargo space. This automatically establishes when the delivery vehicle has reached a destination on the delivery route. As soon as the delivery vehicle has reached a destination on the delivery route, the mobile appliance automatically ascertains which packages in the cargo space need to be delivered to this destination.

As explained above, the delivery driver uses a mobile appliance to produce at least one depiction of a package in the cargo space. Said depiction shows at least one surface of the package.

The image recording appliance of the mobile appliance automatically focuses on a package that is shown ("auto zooming"). The mobile appliance has a dedicated light source in order to illuminate each package in approximately the same way. Preferably, a sensor of the mobile appliance measures the current light conditions in the cargo space. The light source is designed such that undesirable reflections are avoided, and is automatically adapted to the measured light conditions. A "shutter" of the image recording appliance prevents disturbing incidence of light. Where possible, camera shake is subtracted out by computer. If the depiction is not suitable for calculating an identification fingerprint vector from said depiction, the agent is sent a prompt to produce a further depiction of the same package.

In one exemplary embodiment, said image recording appliance—or another image recording appliance—is also used to produce depictions of packages in a buffer store. Said packages are put into at least one delivery vehicle from the buffer store. The results of the image evaluation are used to send a worker prompts indicating which package needs to be put where in which delivery vehicle.

An identification image evaluation unit automatically evaluates the depictions from the mobile appliance. In one exemplary embodiment, the identification image evaluation unit is also part of the mobile appliance and accesses a data memory of the mobile appliance by storing the depictions—preferably the N most recently recorded depictions.

In another exemplary embodiment, the identification image evaluation unit is physically separate from the mobile appliance with the image recording appliance. The image evaluation unit is connected to the mobile appliance via a wireless interface (air interface). The mobile appliance sends the image evaluation unit the depictions of the packages. The image evaluation unit transmits evaluation results and/or messages back to the mobile appliance. The image evaluation unit is either likewise onboard the delivery vehicle, e.g. in a bracket on the dashboard, or outside the delivery vehicle, e.g. in a sorting center with a package sorting installation. The same fixed identification image evaluation unit is able to interchange messages with a plurality of mobile appliances onboard different delivery vehicles.

Usually, the depiction of the package in the cargo space shows at least two surfaces of the package. In this case, a respective depiction of each surface shown is generated from said one depiction by computer. This prompts the edges shown in the original depiction to be automatically spotted, and the spotted edges are used to breakdown the depiction into depiction elements for a respective surface. Each depiction element for a surface is rotated and rid of distortion by computer in order to generate a conditioned depiction that shows the surface from a perpendicular viewing direction.

In one exemplary embodiment, a depiction shows a plurality of packages. This case arises particularly when the image recording appliance is hanging in a bracket or the image recording appliance is being transported past the packages and takes shots automatically, e.g. at a fixed frequency. In this case, the depiction is first of all broken into constituent parts by computer, so that each constituent part shows just one package in each case. Next, each constituent part is broken down into depiction elements for a respective surface of a package by computer.

It is also possible for the same surface of the same package to be shown in a plurality of depictions. In one exemplary embodiment, a plurality of identification feature value vectors that have been generated from depictions that have been produced in direct succession are compared with one another in pairs. From this depiction, at least one identification fingerprint vector is generated. Said one identification fingerprint vector for a package that is to be identified is automatically compared with the respective six registration fingerprint vectors of a particular set of packages. Said set of packages is the entire set or a subset of all packages that are currently still in the cargo space of the delivery vehicle. If the depiction of the package in the cargo space shows a plurality of surfaces of the package, a plurality of identification fingerprint vectors are generated on the depiction, namely a respective vector per surface shown for the package.

EP 2371461 A1 describes how an identification feature value vector is generated for a flat mail item, for which purpose a depiction of a surface of the mail item is evaluated. The mail item is identified by virtue of the identification feature value vector being compared with stored registration feature value vectors. A package can be visually altered in a specific manner after the registration feature value vectors for said package have been generated and before said package is put into the cargo space of the delivery vehicle. By way of example, a label is applied at a particular point on a surface of the package. In order to take account of this systematically made visual alteration, the registration feature value vector and/or the relevant identification feature value vector for the surface in question are altered by computer. A computational method of this kind is described in EP 2371461 A1.

In one exemplary embodiment, the search space with the registration fingerprint vectors used for the comparison is restricted as follows:

The destination to which the sought package is intended to be delivered is prescribed, for example by virtue of a position measuring appliance measuring the current position of the delivery vehicle and comparing it with an intended delivery route. In addition, which packages need to be delivered to which destination is prescribed.

In the embodiment with the prescribed regions in the cargo space, a loading schedule for the cargo space provides the region in the cargo space in which the package is located (or is intended to be located).

In one embodiment, all as yet undelivered packages in the cargo space or in said region form the package set that is searched.

In another embodiment, an intended loading schedule or an actual loading schedule in computer-evaluable form is additionally used, as described in WO 2010/142625 A1, for example. Said loading schedule restricts the location in the cargo space at which a package may be situated, and is used to restrict the search space.

Each fingerprint vector consists of a plurality of feature values. In one exemplary embodiment, the following features are used:

The two dimensions of the at least approximately rectangular surface (width and height), the color or the grayscale value of the background region of the surface, visually detectable features on the surface, e.g. the position and/or the dimensions or the contour of blocks of text, of bar patterns ("bar codes"), of markings or else of spots or soils or of adhesive tapes or of package tapes on the surface, deviations in the actual contour of the surface from an ideal rectangular contour, the surface structure and texture of said surface, the reflection behavior of the surface.

It is possible for an identification fingerprint vector to comprise fewer feature values than the corresponding registration fingerprint vector for said surface of said package.

Usually, a package can, in exemplary embodiments, be identified even when the depiction of the package in a cargo space shows neither the delivery address nor an identifier for the package. Some package senders apply a piece of cardboard to each package, and the customizations and hence the visually detectable forms thereof for these pieces of cardboard differ from package to package. Other package senders secure their packages using package tapes and/or adhesive tapes, the position of which varies from package to package. The customization of a piece of cardboard and the position and size of adhesive tapes and package tapes provide visually detectable and distinguishable features. Further advantageous exemplary embodiments of the invention can be taken from the following detailed description of some exemplary embodiments of the present invention, particularly in conjunction with the figures. However, the figures are intended to serve only the purpose of clarification but not for determination of the scope of protection of the invention. The figures are not to scale and are intended merely to reflect the general concept of the present invention by way of example. In particular features that the figures contain are by no means intended to be regarded as an absolutely necessary part of the present invention.

DESCRIPTION OF THE INVENTION

Figure 1:
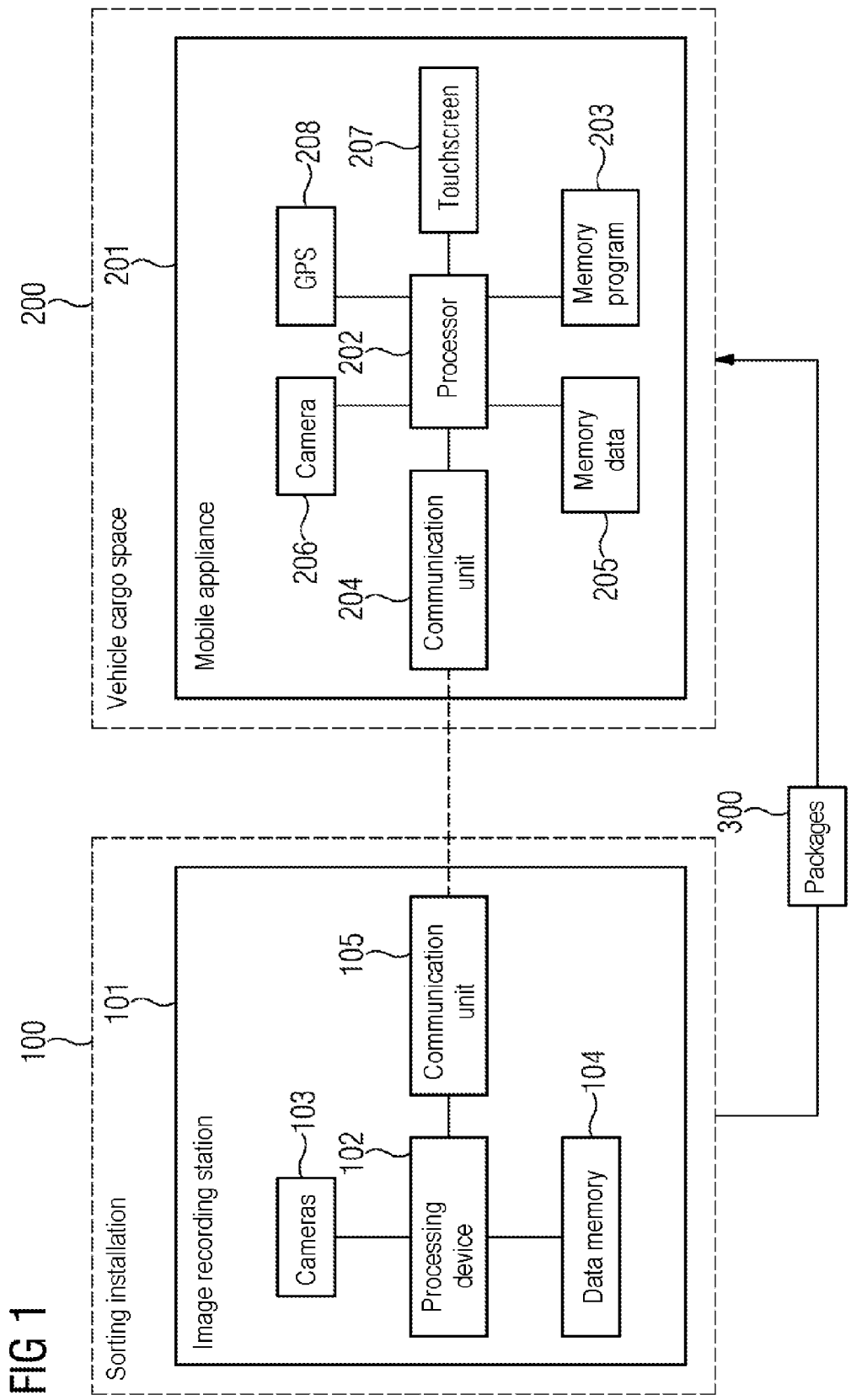
FIG. 1 shows a block diagram of an exemplary embodiment of a system according to the invention.

FIG. 1 is a block diagram of an exemplary embodiment of a system according to the invention. The system comprises a sorting installation 100 and the mobile appliance 201.

The sorting installation 100 comprises an image recording station 101. The image recording station 101 comprises a processing device 102 and, connected to the processing device 102, a plurality of cameras 103, a data memory 104 and a communication unit 105. Furthermore, the sorting installation 100 may comprise arbitrary further components, particularly arbitrary components for the actual carriage and sorting of mail packages in the sorting installation, such as conveyor belts, sorters, chutes, etc.

The cameras 103 are set up and arranged such that they can photograph packages passing through the sorting installation 100 and can transmit the image data produced to the processing device 102. The processing device 102 acts as a registration image evaluation unit and may comprise a program memory and a processor, the processor being able to be set up to execute program instructions stored in the program memory and hence to prompt the image recording station 101 to perform desired actions. Alternatively, the processing device 102 could have a circuit in which corresponding functions are implemented in hardware. A combination of both approaches is likewise possible. By way of example, the processing device 102 may be a server or a portion of a server. The communication unit 105 allows communication with mobile appliances, for example via a WLAN, via Bluetooth, via a mobile radio network or via a temporary cable link, which may be based on USB, for example. Communication can also take place via a plurality of systems. By way of example, the communication unit 105 could allow a mobile appliance to use a mobile radio network and the internet to access the processing device 102. The data memory 104 may be set up to store data in a prescribed structure, for example in tabular form with prescribed types of content. In the exemplary embodiment presented, the processing device 102 is a portion of the image recording station 101 and hence connected to the image recording station 101. The processing device 102, the data memory 104 and the communication unit 105 could also be arranged outside the image recording station 101 and connected to the image recording station 101 and particularly to the cameras 103 directly or indirectly in a suitable manner.

By way of example, the mobile appliance 201 comprises a processor 202 and, connected to the processor 202, a memory 203. The memory 203 is or contains a storage medium that stores programs comprising program instructions. The processor 202 is set up to execute programs from the memory 203 and hence to prompt the mobile appliance 201 to perform particular actions. The processor could be a microprocessor. It could also be embedded in an integrated circuit (IC), for example together with a memory that contains at least the program. In another exemplary embodiment, instead of a processor 202 and a memory 203, the appliance 201 coupled have a circuit in which corresponding functions are implemented in hardware. Together with the memory 203, the processor 202 forms an exemplary identification image evaluation unit and also an exemplary message generation appliance.

By way of example, the mobile appliance 201 additionally comprises, in each case connected to the processor 202, at least one communication unit 204, a further memory 205, a camera 206 as an exemplary image recording appliance, a touchscreen 207 and a GPS receiver 208. The at least one communication unit 204 could comprise a WLAN transceiver and a mobile radio transceiver. Alternatively or in addition, it could comprise other transmitter/receiver units, such as a Bluetooth transceiver or a USB interface. The memory 205 may be set up to store data in a prescribed structure, for example in tabular form with prescribed types of content. The camera 206 has an autofocus function. Furthermore, it has an associated light source and an associated ambient light sensor. Both components (not shown separately) may be directly part of the camera 206, or may be provided in the mobile appliance 201 generally for other purposes too. Alternatively or in addition to the touchscreen 207, other user interfaces could also be provided for input and for output. Alternatively or in addition to the GPS receiver 208, receivers for other satellite navigation systems could also be provided.

The mobile appliance 201 may optionally have any other components, such as a scanner.

By way of example, the mobile appliance 201 may be a Smartphone, but it could also be any other portable mobile data-processing appliance, for example an appliance provided specifically for package deliveries.

The mobile appliance 201 may be associated with a particular delivery vehicle. Particular packages 300 that leave the sorting installation 100 are put into a cargo space 200 in the vehicle and sorted into a respective slot therein. It goes without saying that the slots could also be part of a mobile shelf, and that the packages 300 could then also be placed into slots in the shelf outside a vehicle, and that the loaded shelf could then be slid into the cargo space 200. It is assumed that each package to be transported passes through a sorting installation corresponding to the sorting installation 100 at least once on the path from the sender to the recipient before it reaches the delivery vehicle.

In the system shown in FIG. 1, in a first variant, the system or the vehicle with the cargo space 200 shown or the mobile appliance 201 may be an exemplary embodiment of an arrangement according to the invention. In the system from FIG. 1, in a first variant, the mobile appliance 201 or a component comprising the processor 202 and the memory 203 may be an exemplary embodiment of an apparatus according to the invention.

Figure 2:
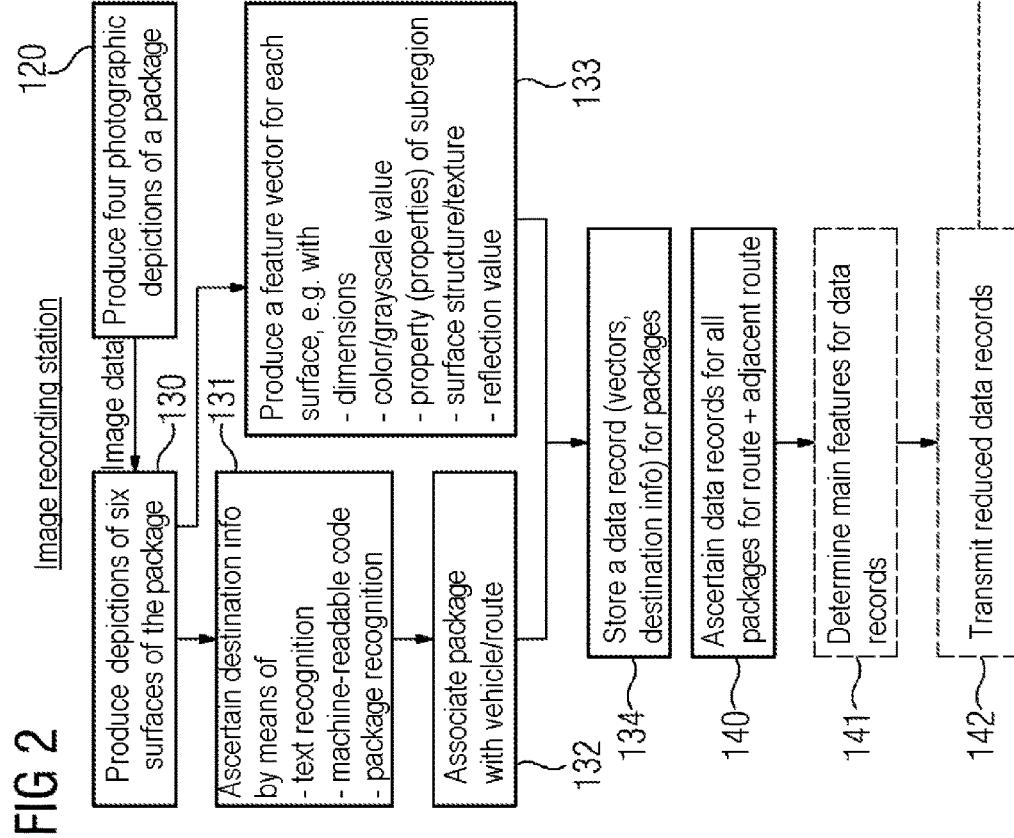
FIG. 2 shows a flowchart that illustrates a first exemplary embodiment of the method according to the invention.

FIG. 2 shows a flowchart that illustrates a first exemplary method according to the invention in the system from FIG. 1 for this variant. The left-hand side shows actions on the image recording station 101, and the right-hand side shows actions on the mobile appliance 201.

The cameras 103 of the image recording station 101 produce digital and hence computer-accessible depictions of each package that passes through the sorting installation 100. (Action 120) In this case, the cameras 103 produce an adequate number of depictions of a package from suitable angles that allow all six surfaces of the package to be recognized completely and distinctly. By way of example, an arrangement comprising four cameras 103 can produce four depictions of a package, a depiction from above, a depiction from below and two depictions from two different lateral directions. In this case, the depictions can be produced automatically, for example using a sensor that indicates to the cameras 103 when a package passing through is at a point provided for a respective shot.

The image data from the digital depictions are transmitted to the processing device 102. The subsequent actions in the image recoding station 101 are performed or prompted by the processing device 102, for example by virtue of appropriate program instructions being executed by a processor.

From the image data obtained, the processing device 102 produces a respective digital depiction of each of the six surfaces of the package and hence dedicated image data for each of the surfaces. (Action 130) If image data are obtained for the four depictions of the package that are described above, it is possible for depictions of two lateral surfaces to be respectively produced from a lateral depiction of the package by means of projection.

It is then firstly ascertained which of the six depictions has a flag for the destination of the package, and the flag is used to create a piece of destination information. (Action 131) By way of example, the flag may be existent in a form that can be read by a human being, that is to say as a written-out address or coordinates. In this case, text recognition (OCR—Optical Character Recognition) can be performed in order to obtain a statement of the destination. Additionally or alternatively, the flag may be existent in machine-readable form. This may be a barcode, for example, that can be evaluated by an apparatus directly in order to obtain a statement of the destination, or an explicit identifier for the package that uses a database query to provide a statement of the destination. The destination information may contain a statement of the destination in the form of an address or of coordinates or may allow direct derivation of such a statement. Alternatively, it may be a coding for the destination that possibly just uses a database query to provide a statement of the destination.

On the basis of the ascertained destination, the package is additionally assigned to a particular route and an identity for the route is ascertained. (Action 132) Alternatively, the package could be assigned to a particular vehicle or to a particular mobile appliance and a corresponding vehicle or appliance identity could be ascertained. However, use of the route has the advantage of greater flexibility. By way of example, in the event of a faulty vehicle, it is readily possible to use another vehicle for the same route. In addition, mobile appliances can be used flexibly for various routes without the need to be mindful of a particular assignment.

Secondly, a feature vector is produced as a registration feature value vector separately for a respective one of the six surfaces from the six depictions produced. (Action 133) Each feature vector is a compilation of values that numerically indicate various visual features or properties of a surface. A feature vector can also be referred to as a "fingerprint" vector, since it can be regarded as a unique fingerprint for a surface as it were.

By way of example, at least one feature may comprise absolute or relative dimensions for the surface. In this case, a relative dimension may be the ratio of length to width for the surface, for example. At least one feature may comprise a mean color value or a mean grayscale value for the entire surface and/or for a background region of the surface, for example. At least one feature may furthermore represent a surface structure or texture, for example. At least one feature may furthermore indicate a reflection value for the surface, for example. At least one feature may furthermore indicate a property of a visually highlighted subregion of the surface. By way of example, visually highlighted subregions may result from blocks of text, bar patterns, markings, spots, soils, adhesive tapes or package tapes on the surface. One property of a subregion may be the position and/or the dimensions and/or the contour of the subregion.

The six registration feature value vectors for a package are stored in the data memory 104 as a data record for the package together with the destination information ascertained in action 131 and the identity of a vehicle or of a route that is ascertained in action 132. (Action 134) Both the destination information and the identity are therefore each a stored statement linked to the registration feature value vectors. The image data for the depictions of the package that are delivered by the cameras 103 and the image data from the depictions of the surfaces that are produced in action 130 can but do not have to be stored.

The actions 120 and 130-134 are performed for all packages that pass through the sorting installation 100. The destination information for all packages that is ascertained in action 131 could also be used to generate a general distribution schedule that stipulates what packages need to be delivered on the current day, or in the ongoing production cycle, using which delivery vehicle. In order to prevent too many packages from being allocated to a vehicle in action 132, it is also possible for a distribution schedule and action 132 to be created only after the packages that are currently to be delivered have been processed on the basis of all the stored data records. The data records stored in action 134 can then be augmented by an identity for the route subsequently stipulated for a package or for the subsequently stipulated vehicle.

The packages that have passed through the sorting installation 100 are put into the cargo space of an allocated delivery vehicle. The cargo space contains a large number of slots. Each package is accommodated in one of these slots. The accommodation can be effected according to size, or on the basis of an automatically created allocation scheme, to the extent that the packages fit into the associated slots in terms of size. The allocation scheem may provide for sorting according to destinations, and may additionally already take account of other criteria, such as approximately detected sizes of the packages.

When all packages have passed through the sorting installation 100 for a particular production cycle, the processing device 102 respectively ascertains all data records for a route that contain an identification for said route. In addition, all data records that contain an identification for a neighboring route of this route are ascertained. (Action 140) When routes have essentially been stipulated, the neighboring routes can be selected on the basis of a stored specification, for example.

The ascertained data records for a particular route and the neighboring routes could now be transmitted to a mobile appliance 201. The registration feature value vectors in these data records already require much less memory space and bandwidth for transmission than the image data from the depictions of the surfaces.

Optionally, however, it is first of all possible to use consolidation to reduce the number of values in the registration feature value vectors. To this end, all registration feature value vectors from the ascertained data records for a particular route and for the neighboring routes are compared with one another. On the basis of the comparison, those features of the registration feature value vectors that are best suited to distinguishing the packages in question are ascertained as main features. (Action 141) The associated values are then used to produce a new, reduced registration feature value vector for each registration feature value vector.

The ascertained data records can then be transmitted with the reduced registration feature value vectors to a mobile appliance 201. (Action 142) The transmission can be effected via a WLAN of the sorting installation 100, for example.

The transmission of data records to a mobile appliance 201 can be effected upon a request by the mobile appliance 201, for example, the appliance 201 being able to identify a route on which it is intended to be used. The identification of the route may be stored in the mobile appliance 201 as a parameter or respectively input by a user who prompts the request.

The mobile appliance 201 receives the data records and stores them in memory 205. (Action 220) The request for the data records and the storage of the data records can be prompted by the processor 202 by executing corresponding program instructions in the memory 203.

A delivery driver carries the mobile appliance 201 with him and drives the vehicle that contains the packages along the designated route. The route does not need to have been prescribed completely, but rather can be adapted flexibly on the basis of the destination information pertaining to the loaded packages. The destination information in the data records stored in the mobile appliance 201 can be used at the beginning of the trip to create a tour schedule that indicates the precise profile of the route and the points at which packages need to be delivered. Alternatively, the tour schedule can also be ascertained by the image recording station 101 itself and sent to the mobile appliance 201.

The delivery driver stops at the designated points and enters the cargo space 200. In the cargo space 200, the delivery driver uses the camera 206 of the mobile appliance 201 to produce a digital depiction of a package. (Action 230) The depiction shows at least one surface of the package. The camera 206 focuses for the shot automatically, and the light source of the mobile appliance 201 illuminates a package approximately uniformly during each shot. To this end, the ambient light sensor measures the current light conditions in the cargo space 200, and the light source automatically adapts the illumination to the light conditions measured. This also allows undesirable reflections to be minimized. A "shutter" of the mobile appliance 201 additionally prevents disturbing incidence of light.

The subsequent actions in the mobile appliance 201 are performed or prompted by the processor 202 again by virtue of said processor performing appropriate program instructions from the memory 203. The program instructions may be part of a program for recognizing packages.

The processor 202 receives the image data from the depiction recorded by the camera 206 and subtracts camera shake out of the recording as far as possible. (Action 240) If the depiction is still not suitable for the desired further processing, the driver is sent a prompt via the touchscreen 207 indicating that a further photograph of the same package needs to be taken. In that case, the processor then continues with action 230.

Otherwise, image data from a depiction of at least one surface of at least one package are produced from the image data from the depiction produced by the camera 206. (Action 241) Usually, a depiction of a package produced by means of a camera 206 shows at least two surfaces of the package. A respective depiction of each surface shown can then be generated from said one depiction of the package by computer. In this case, the edges shown in the original depiction of the package are automatically recognized, and the recognized edges are used to breakdown the depiction into separate depictions for each surface. Each depiction for a surface is rotated and rid of distortion by computer in order to generate a conditioned depiction of the surface that shows the surface from a viewing direction at right angles.

The depiction for a surface is used to generate a feature vector as an identification feature value vector. (Action 242) If it has been possible to produce depictions for a plurality of surfaces of the same package, then a feature vector can be generated as identification feature value vector for each of said surfaces. If the registration feature value vectors in the data records received and stored in action 220 have been reduced to main features in action 141, it is also necessary to generate only identification feature value vectors consisting of said main features in action 242. What these main features are can be ascertained on the basis of the data records stored in memory 205.

The at least one identification feature value vector produced is then compared with the registration feature value vectors stored in memory 205. (Action 243) In this case, the comparison can be made with all registration feature value vectors stored, or with a subset of the registration feature value vectors stored. By way of example, the data records for packages that have already been delivered could be marked accordingly. The registration feature value vectors from these data records then no longer need to be taken into account for the comparison.

The comparison can be terminated as soon as a registration feature value vector has been found that has at least a prescribed similarity to the identification feature value vector. In this case, the similarity may be provided by the sum or the mean value of the differences between the values for the same feature in each case, for example. The differences for different features can optionally be weighted differently in this case. By way of example, the prescribed similarity may exist when said sum or said mean value is below a prescribed threshold value. Other criteria are likewise possible, however. It may thus also be possible for a difference between values to be taken into account individually for each feature, and different threshold values could be prescribed for different features.

Alternatively, it would be possible for the identification feature value vector to be always compared with all of the relevant registration feature value vectors. Among possibly multiple sufficiently similar registration feature value vectors, it would then be possible for the most similar registration feature value vector to be regarded as matching.

If a registration feature value vector has a sufficient degree of match with the identification feature value vector, it is assumed that the stored data record with said registration feature value vector belongs to the package in the cargo space 200 from which the delivery driver has created a digital depiction using the camera 206.

If a plurality of identification feature value vectors have been generated on the basis of the digital depiction of the package in action 242, it would be possible for a data record to be regarded as belonging to the package only if there is a sufficiently similar registration feature value vector in said data record for each identification feature value vector.

Since the data records obtained and stored in memory 205 contain not only data records for packages for the route that the vehicle is to take but also data records for packages that should be delivered on an adjacent route according to schedule, packages are found even if the actual loading and delivery of the packages differs from scheduled loading and delivery.

The data record found contains a piece of destination information as a stored statement linked to the registration feature value vectors contained. On the basis of said destination information, a message to the delivery driver is produced. (Action 244) By way of example, the message may contain the address at which the photographed package is intended to be delivered. Alternatively, the processor 202 can receive a statement about the current position of the vehicle from the GPS receiver 208. The processor 202 can then use appropriate program instructions to evaluate whether the delivery address is within a small, prescribed radius around the current position. In addition or as an alternative to the address, the message may then comprise the statement "Deliver package here" if the delivery address is within the radius; alternatively, it may comprise the statement "Photograph next package" if the delivery address is outside the radius. It goes without saying that these statements do not need to be text-based or voice-based. By way of example, the message could provide a green signal if the package needs to be delivered at the present position and a red signal if the package does not need to be delivered at the present position. Additionally or alternatively, the message could provide a map on which the current position and the delivery address are marked.

The message produced is then output. (Action 245) By way of example, the output can be effected via the touchscreen 207. Other forms of outputs likewise come into consideration, however, for example an audio message via a loudspeaker of the mobile appliance 201.

If the message contains only the address at which the package needs to be delivered, then the delivery driver himself needs to assess whether the address is in the immediate vicinity and the photographed package needs to be delivered.

Only when the delivery driver is provided with the direct or indirect information that the photographed package needs to be delivered at the current position does he remove the package from the slot. He establishes with a very high degree of probability that it is actually the package that needs to be delivered in the immediate vicinity of the present position, and he attempts to deliver said package.

If the delivery was successful, he can input this into the mobile appliance 201 using the touchscreen 207. The processor 202 can then erase or mark the corresponding data record in the memory 205. (Action 246) For subsequent comparisons on the basis of action 243 for other packages, this data record then no longer needs to be taken into account. If the delivery was not successful, the delivery driver places the package back into a slot. In addition, the delivery driver could input advice of the delivery attempt into the mobile appliance 201 using the touchscreen 207. The processor 202 can then mark the corresponding data record in the memory 205 separately.

Actions 230 to 246 are repeated until all packages to be delivered at the current position have been ascertained. It goes without saying that the delivery driver can first of all ascertain all of the packages to be delivered (actions 230-245) before he delivers the packages found, in order to save duplicate journeys. When all packages to be delivered at the current position have been ascertained, a corresponding message can be output to the delivery driver, for example "Delivery at this destination is complete". Actions 230 to 246 are then repeated at another position until the entire route has been traveled.

The at least one surface detected in action 230 does not necessarily need to show a flag for the destination or an explicit identifier for the package. Nevertheless, it is possible for a piece of information about the package to be provided for the delivery driver without the latter needing to rotate the package in order to render a flagging statement visible. This allows a large amount of time to be saved during delivery.

In the system from FIG. 1, the processing device 102 of the image recording station 101 or an apparatus that comprises the processing device 102 may, in a second variant, be an exemplary embodiment of an apparatus according to the invention.

Figure 3:
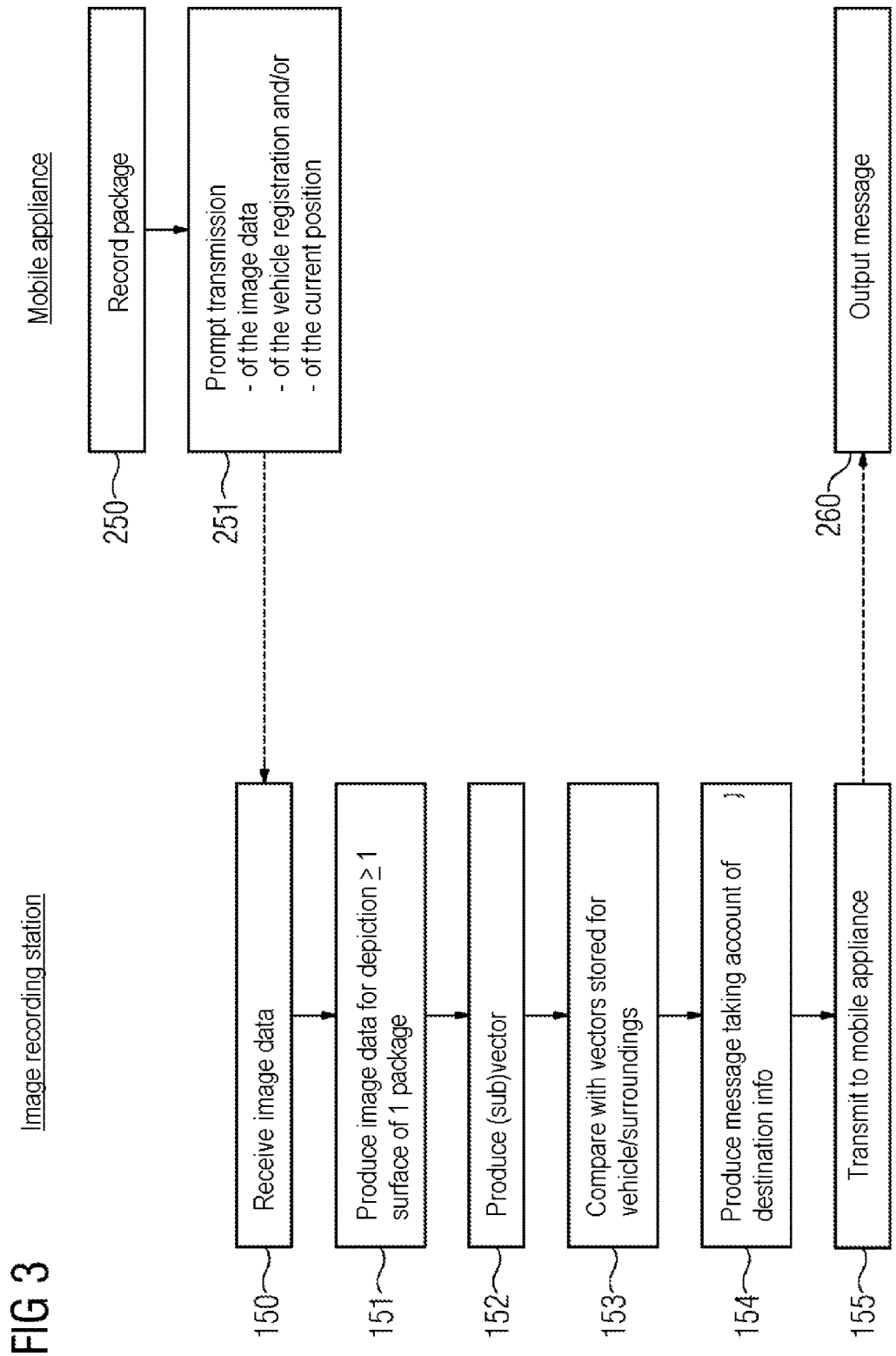
FIG. 3 shows a flowchart that illustrates a second exemplary embodiment of the method according to the invention.

FIG. 3 is a flowchart that illustrates a second exemplary method according to the invention in the system from FIG. 1 for said second variant. The left-hand side shows actions on the image recording station 101 and the right-hand side shows actions on the mobile appliance 201.

The image recording station first of all performs actions 120 to 134, described with reference to FIG. 2, for all packages in a production cycle. In contrast to the method from FIG. 2, the data records created are then not transmitted to the mobile appliance 201 however.

The mobile appliance 201 is again used by a delivery driver in the cargo space 200 of the vehicle to record a digital depiction of a package in a slot. (Action 250) The processor 202 then executes appropriate program instructions from memory 203 in order to prompt transmission of the image data from the digital depiction, an identifier for the vehicle or a route provided for the vehicle and/or a statement regarding a current position ascertained by the GPS receiver 208 to the image recording station 101. (Action 251) The identifier may be stored in memory 205. The transmission can be effected as part of a request to the image recording station 101 to provide a piece of information about the recorded package. By way of example, the transmission can be effected by means of the communication unit 204 via a mobile radio network in combination with the internet.

The subsequent actions on the image recording station 101 are performed or prompted by the processing device 102, for example by virtue of appropriate program instructions being performed by a processor.

The image recording station 101 receives the image data from the mobile appliance 201 via the communication unit 105. (Action 150) To this end, the processing device 102 may be set up as a server that is accessible via the internet, for example.

On the basis of the received image data from a depiction of a package, the image recording station 101 produces image data for a respective depiction of at least one surface of the package. (Action 151) This corresponds to the action 241 performed by the mobile appliance 201 in a method shown in FIG. 2.

The depiction for at least one surface is used to generate a respective feature vector as an identification feature value vector (Action 152) This corresponds to the action 242 performed by the mobile appliance 201 in the method shown in FIG. 2.

The image recording station 101 then compares the identification feature value vector with registration feature value vectors stored in the data memory 104. (Action 153) This corresponds to the action 243 performed by the mobile appliance 201 in the method shown in FIG. 2.

The comparison in action 153 can be limited to registration feature value vectors in such data records as contain a vehicle or route identity that match an identifier for the vehicle or a route provided for the vehicle that is transmitted by the mobile appliance 201 or—possibly—that contain a vehicle or route identity that is associated with a neighboring route. In addition or alternatively, the comparison can be limited to registration feature value vectors in such data records as contain a piece of destination information that indicate a destination in an immediate vicinity of a current position of the mobile appliance 201 that is transmitted by the mobile appliance 201.

If, in action 153, a registration feature value vector is found that has a prescribed degree of match with the generated identification feature value vector, the image recording station 101 produces a message taking account of the destination information that is stored in the same data record as the registration feature value vector that is found. (Action 154) The message may contain an address or coordinates according to the destination information.

If the data obtained from the mobile appliance 201 in action 150 contain a statement of the current position of the mobile appliance 201 and the position is taken into account for the selection of the registration feature value vectors that are to be compared, the message may, in principle, additionally or alternatively contain advice that the package for which the image data have been received is to be delivered at the current position of the mobile appliance 201 in the event of a match being found in action 153. If no registration feature value vector that has a prescribed degree of match with the generated identification feature value vector is found in action 153 in this case, the message may contain advice that the package for which the image data have been received is not to be delivered at the current position of the mobile appliance 201. If there is not even a possibility of a registration feature value vector for comparison in action 153 in this case, the message may contain advice that the delivery vehicle has no package at all to be delivered at the current position of the mobile appliance 201.

If the data obtained from the mobile appliance 201 in action 150 contain a statement of the current position of the mobile appliance 201 but the position is not taken into account for the selection of the registration feature value vectors that are to be compared in action 153, then when a match is found it is additionally possible to ascertain whether the destination information indicates a destination that is in the immediate vicinity of the indicated position. If this is the case, the message may additionally or alternatively contain advice that the package for which the image data have been received is to be delivered at the current position of the mobile appliance 201. Otherwise, the message may additionally or alternatively contain advice that the package for which the image data have been received is not to be delivered at the current position of the mobile appliance 201.

The message produced is transmitted to the mobile appliance 201. (Action 155) For this, it is possible to use the same communication media as for the transmission of the image data.

The mobile appliance 201 receives the message and outputs it—following any conditioning—to the delivery driver. (Action 260) By way of example, the output can be effected via the touchscreen 207. Other forms of output likewise come into consideration, however. On the basis of the output message, the delivery driver can then decide whether the package needs to be removed or whether a shot of a further package needs to be taken.

Figure 4:
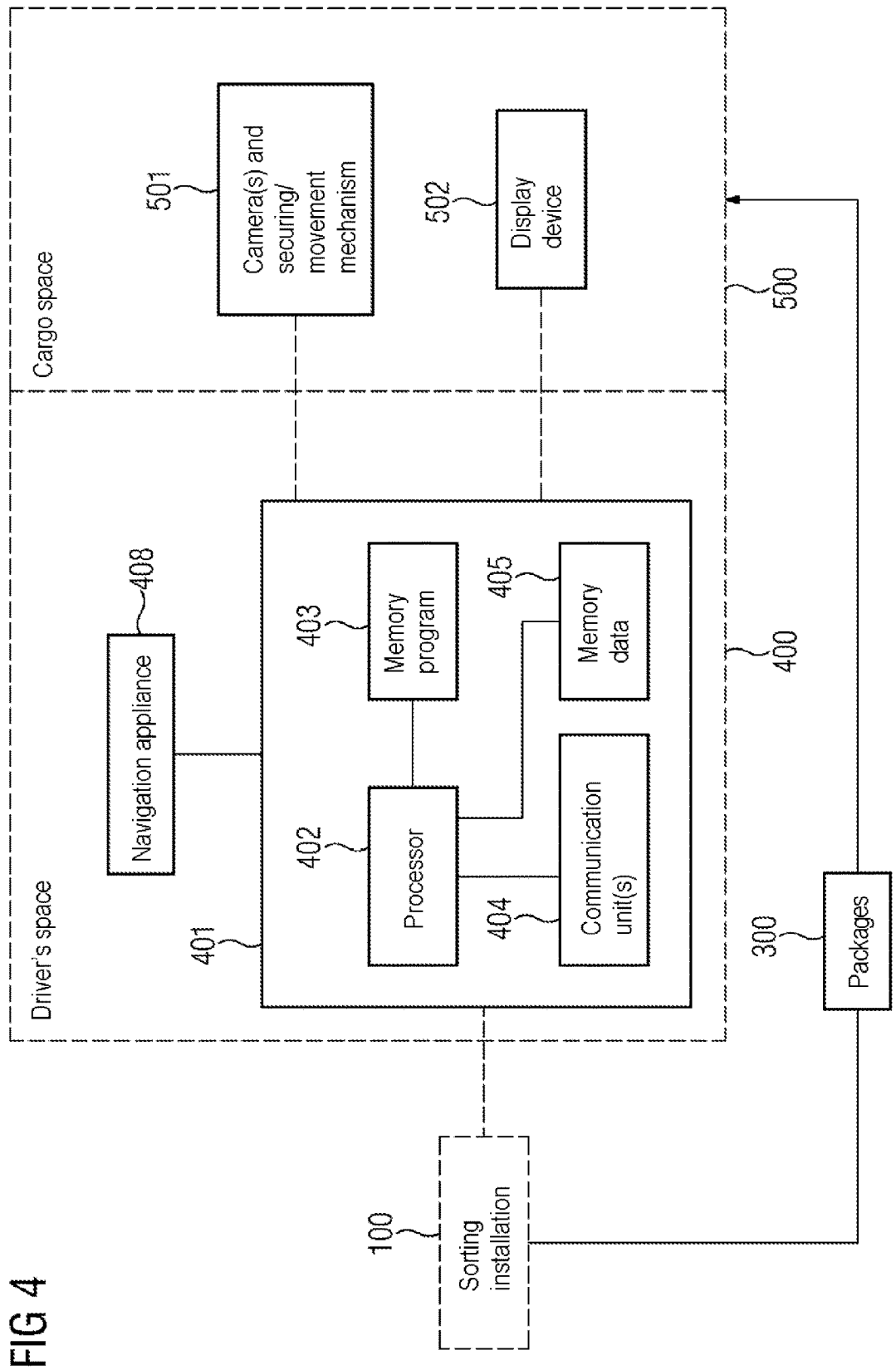
FIG. 4 shows a block diagram of a further exemplary embodiment of a system according to the invention.

FIG. 4 is a block diagram of another exemplary embodiment of a system according to the invention. The system comprises a sorting installation and a delivery vehicle.

The sorting installation may correspond to the sorting installation 100 from FIG. 1 and is therefore likewise provided with reference symbol 100. For the details, reference is made to the description of the sorting installation 100 from FIG. 1. The vehicle comprises a driver space 400 and a cargo space 500.

The driver space 400 comprises an apparatus 401, which may be accommodated in the dashboard or can be inserted into a bracket on the dashboard, for example. By way of example, the apparatus 401 comprises a processor 402 and, connected to the processor 402, a memory 403. The memory 403 is or contains a storage medium that stores programs comprising program instructions. The processor 402 is set up to execute programs from the memory 403 and hence to prompt the apparatus 401 and connected components to execute particular actions. The programs comprise a program for recognizing packages. The memory 403 can additionally be used to store programs or also data. The processor could be a microprocessor. It could also be embedded in an integrated circuit (IC), for example together with a memory that contains at least the program. In another exemplary embodiment, instead of a processor 402 and a memory 403, the apparatus 401 could have a circuit in which corresponding functions are implemented in hardware.

The apparatus 401 additionally comprises, by way of example, in each case connected to the processor 402, communication units 404 and a further memory 405. The communication units 404 could comprise a WLAN transceiver and a Bluetooth transceiver. The memory 405 may be set up to store data in a prescribed structure, for example in tabular form with prescribed types of content. The apparatus 401 may optionally have any other components, such as a user interface for inputs and/or outputs.

The driver space 400 additionally comprises, by way of example, a navigation appliance 408 that is connected to the apparatus 401. By way of example, the navigation appliance 408 may comprise a GPS receiver and/or a receiver for another satellite navigation system. In addition, by way of example, it can obtain travel-specific information from the vehicle. The navigation appliance 408 is set up to determine a current position of the vehicle, inter alia. In addition, it can ascertain and provide navigation information for a driver, for example.

The cargo space 500 of the vehicle comprises differently sized slots (not shown) into which packages can be placed.

The cargo space 500 additionally comprises at least one camera 501. If a plurality of cameras 501 are provided, they may be installed permanently by means of a securing mechanism and rigidly oriented such that all of the cameras 501 are able to produce depictions of all of the slots. If only one camera 501 is provided, this camera may be mounted permanently at one point by means of a securing mechanism, but able to be oriented by means of a movement mechanism such that the camera 501 can produce depictions of all of the slots. In this case, the movement mechanism may comprise a motor. If only one camera 501 is provided, it may alternatively be fitted on a guide rail of a securing mechanism, for example, and moved along the guide rail by means of a movement mechanism such that the camera 501 can produce depictions of all of the slots. The movement can be effected at constant speed, and optionally an interruption in the movement can be effected for one shot in each case. It goes without saying that any combinations and modifications of these three exemplary embodiments are possible.

The changes in the orientation that are to be brought about or the movement along a guide rail that is to be brought about may be firmly prescribed for a drive of a movement mechanism, so that the respective movement is performed automatically. The camera 501 may be set up to record depictions automatically at appropriate intervals of time. Alternatively, the motor and/or camera(s) 501 may be remote controlled by means of the apparatus 401, whether via a cable-connected link or via a wireless link.

The cargo space 500 additionally comprises a display device 502. This may be in a wide variety of forms. By way of example, it may be a screen, or light-emitting diodes (LEDs) at each slot, etc. The display device 502 is set up such that it can obtain commands from the apparatus 401, whether via a cable-connected link or via a wireless link.

In one variant, the camera 501 and the display device 502 could again be part of a mobile appliance that a delivery driver can take with him into the cargo space 500. In this case, the delivery driver can hold the camera 501 for producing a respective depiction of a package as required, and the mobile appliance can communicate with the apparatus 401 via a wireless link, for example a Bluetooth link. A guide rail, as described above, fitted in the cargo space 500 may alternatively be set up such that it has a bracket or a way of securing a bracket for a mobile appliance with camera 501.

Particular packages 300 that leave the sorting installation 100 are put into a cargo space 500 in the vehicle and sorted into a respective slot therein. A delivery driver then drives the vehicle along a designated route.

In the system shown in FIG. 4, the system or the vehicle is an exemplary embodiment of an arrangement according to the invention. In the system shown in FIG. 4, the vehicle or the apparatus 401 or another unit comprising the processor 402 and the memory 403 is an exemplary embodiment of an apparatus according to the invention.

Figure 5:
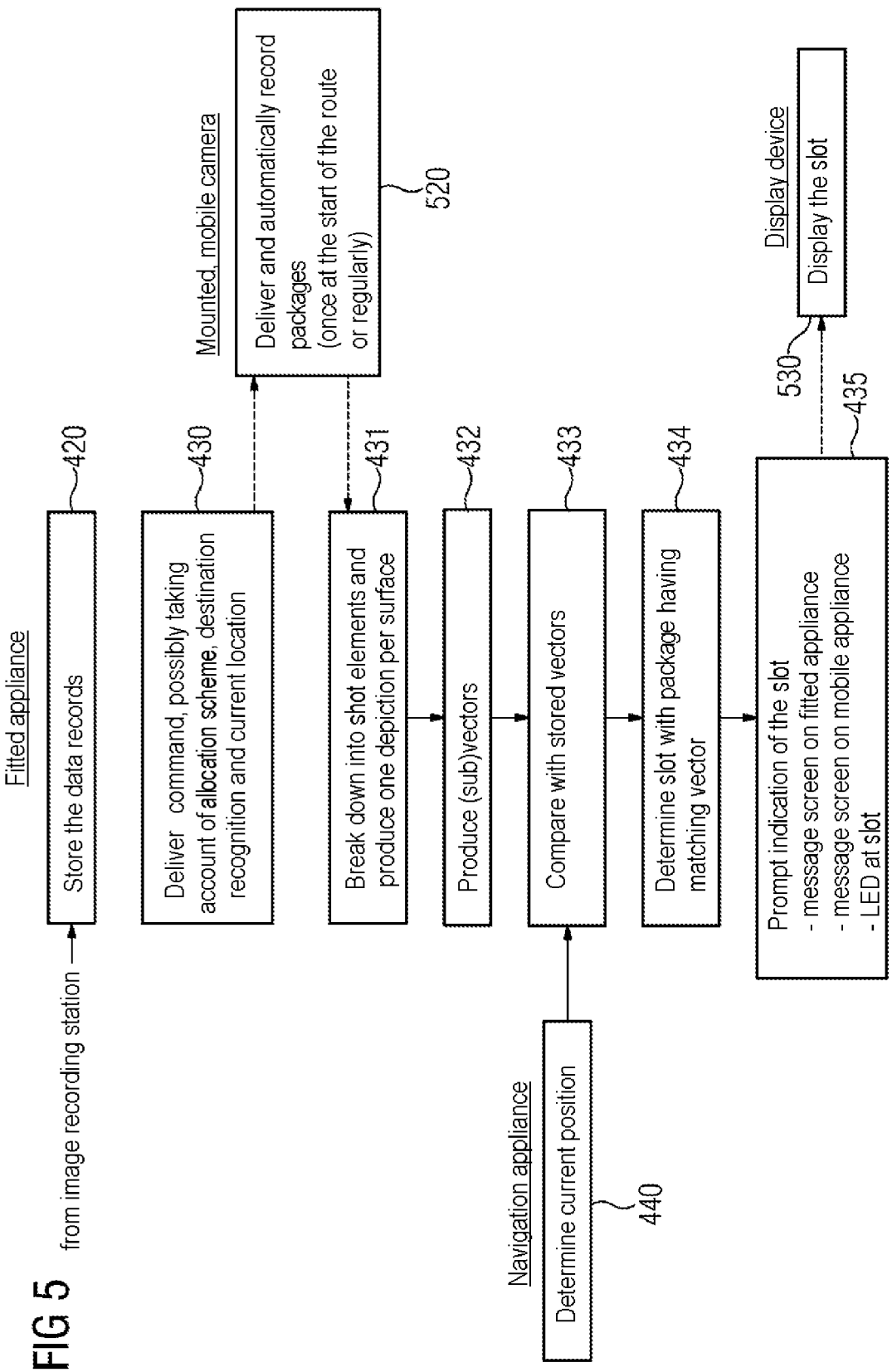
FIG. 5 shows a flowchart that illustrates a third exemplary embodiment of the method according to the invention.

FIG. 5 is a flowchart that illustrates an exemplary method according to the invention in the system from FIG. 4. The actions shown in the center are prompted by the processor 402 when it executes program instructions from the memory 403. The left-hand side additionally shows an action by the navigation appliance 408, and the right-hand side shows actions by the camera 501 and by the display device 502.

The image recording station 101 of the sorting installation 100 first of all performs the actions 120 to 142 described with reference to FIG. 2. In contrast to the method from FIG. 2, the data records produced are transmitted not to the mobile appliance 201 but rather to apparatus 401, however. By way of example, the transmission can be effected by means of WLAN when the vehicle is in proximity to the sorting installation 100 or in the sorting installation 100 for the purpose of loading. By way of example, the transmission can be effected automatically, since it may be assumed that all vehicles that are provided for the currently pending deliveries are nearby. Alternatively, it can be effected in response to a user input on the sorting installation 100 or on the apparatus 401. The transmission can be effected before, during or after the loading of the vehicle with the packages.

The apparatus 401 receives the data records and stores them in the memory 405. (Action 420)

If a plurality of rigidly fitted cameras 501 are provided, the apparatus 401 produces commands to the cameras 501 for creating digital depictions, for example. If at least one mobile camera 501 is provided, the apparatus 401 produces commands to a motor for orienting and/or moving the camera 501 and commands to the camera 501 for producing a digital depiction at a respective position. (Action 430)

The shots can be taken once at the beginning of a delivery route or repeated. Repeated shots can be taken at regular intervals at a prescribed frequency, or at a respective stopping point on the route. The shots can be prompted by the apparatus 401 automatically, or in response to a user input. For automatically prompted, repeated shots, the apparatus 401 could also compare a current position obtained from the navigation appliance 408 with the destination information in the stored data records, for example. If a match is found, the driver can then be asked by means of a screen or loudspeaker (not shown) of the apparatus 401 to stop as soon as possible. As soon as the data from a navigation appliance 408 allow it to be inferred that the vehicle has come to a standstill, the apparatus 401 can then prompt the shots by the at least one camera 501. This can have the effect of avoiding camera shake in the shots. Repeated shots at a fixed frequency could also be taken automatically without being prompted by the apparatus 401.

The at least one camera 501 takes the shots and sends the image data from the depictions produced to the apparatus 401. (Action 520)

The apparatus 401 receives the image data from the depictions.

A respective depiction for which image data are received on the apparatus 401 can show a plurality of packages. In this case, the depiction can first of all be broken down into constituent parts by computer, so that each constituent part respectively shows just one package. Next, each constituent part is broken down into depiction elements for at least one respective surface of a package by computer. (Action 431) The latter corresponds to action 241 described with reference to FIG. 2.

For the depiction of each surface, a feature vector is generated as an identification feature value vector. (Action 432) This corresponds to action 242 described with reference to FIG. 2. The identification feature value vectors may again contain values for all features originally taken into account for the registration feature value vectors in the sorting installation 100, or just for a portion of said features. It is also possible for the same surface of a package to be shown in a plurality of shots from the at least one camera 501, so that a plurality of identification feature value vectors are produced for the same surface of a package in action 432. In one exemplary embodiment, the identification feature value vectors that have been generated from shots that have been taken simultaneously or in direct succession by the at least one camera 501 are then compared with one another in pairs. In the event of a match, a respective one of the identification feature value vectors can be erased.

On the basis of the known fitting and/or orientation of the at least one camera 501 when the shots are taken, each identification feature value vector can be associated with a particular slot. The association can likewise be stored in memory 405.

The apparatus 401 then compares the identification feature value vectors produced with the registration feature value vectors stored in memory 405 for a respective data record. (Action 433) This corresponds to action 243 described with reference to FIG. 2.

If, according to a first exemplary option, the comparison is performed only once at the beginning of a route, the identification feature value vectors are compared with all registration feature value vectors and the results are stored in memory 405. By way of example, a respective data record for a package in memory 405 can be augmented by the statement of a slot. The slot is the slot that has been associated with the identification feature value vector that matches one of the registration feature value vectors in the data record to a prescribed degree. Alternatively, for a respective data record, it is possible to store image data pertaining to a depiction of a surface on the basis of which depiction the identification feature value vector that matches one of the registration feature value vectors in the data record to a prescribed degree has been produced. When a delivery driver now stops on the route, for example on the basis of a tour schedule, the apparatus 401 ascertains for the current position provided by the navigation appliance 408 which of the stored data records contain a piece of destination information that indicates a delivery address in the immediate vicinity. By way of example, the ascertainment can be effected at the request of the delivery driver. For the data records found, the stored slot statements and/or the stored image data are then read. (Action 434)

The apparatus 401 then prompts output of a corresponding piece of information to the delivery driver via the display device 502. (Action 435) The information can be output via a screen of a display device 502 fitted in the cargo space 500 or via a screen of a mobile appliance carried by the delivery driver. The output can identify the slots that contain packages to be delivered at the current location or may show a depiction of a visible surface of the packages. If the display device 502 comprises at least one LED per slot, in each case arranged directly next to the slot, then the output of the information could also involve the LEDs that are associated with slots that contain packages to be delivered at the current location being switched on. (Action 530) In an alternative embodiment, the information is output via a screen of the apparatus 401, and in this case the apparatus 401 is preferably fitted in a bracket in the driver's cab 400, so that the delivery driver can take the apparatus 401 with him into the cargo space 500.

If the comparison of the identification feature value vectors with registration feature value vectors in action 433 is performed not once at the beginning of a route but rather, according to a second exemplary option, repeatedly, on the other hand, then the search space for the registration feature value vectors used for the comparison can be restricted in each case.

The search space for the registration feature value vectors used for the comparison can be restricted to the registration feature value vectors that belong to stored data records for as yet undelivered packages.

In addition or alternatively, it is possible to take account of only the registration feature value vectors that belong to a respective data record that comprises a piece of destination information that indicates a delivery address that is in the immediate vicinity of a current position indicated by the navigation appliance 408.

In addition or alternatively, the search space for the registration feature value vectors used for the comparison can be restricted specifically for each identification feature value vector on the basis of an allocation scheme, since the allocation scheme restricts the location in the cargo space at which a package should be located. If the slots that have been captured are known for a shot by a camera 501, for example, then the allocation scheme can be used to select the data records for the packages that should be located in one of said slots according to schedule. The allocation scheme may be an intended allocation scheme or an actual allocation scheme. The creation of an actual allocation scheme on the basis of an intended allocation scheme is described in the document WO 2010/142625 A1, for example. Particularly in the case of an intended allocation scheme, the search space can be restricted for a first search round. If the first search round does not reveal a match between an identification feature value vector and a registration feature value vector from the restricted search space, the search can be extended to other registration feature value vectors.

In the second option too, it is then possible to determine the slots that correspond to the identification feature value vectors for which a matching registration feature value vector with associated destination information that indicates a delivery address in the immediate vicinity of the current position has been found. (Action 434) Alternatively, it would again be possible to provide image data for the depictions of the surfaces on the basis of which matching identification feature value vectors for the current position have been produced.

For the second option, however, it is not absolutely necessary to store a piece of information about the slots and/or image data with an association with data records, since the information can be used directly for a message to the delivery driver. In this case, too, the apparatus 401 prompts the output of a piece of information that indicates to the delivery driver those slots from which packages are intended to be removed at the current position for a delivery attempt. (Action 435) A corresponding piece of information is output by the display device 502. (Action 530)

Following successful delivery of a package, the delivery driver can again make a corresponding input into the apparatus 401, so that the apparatus 401 can mark the associated stored data record in memory 405 and ignore it for the next comparison.

If the comparison of the identification feature value vectors with registration feature value vectors in action 433 is performed repeatedly, in accordance with the second option, this can have the effect that re-sorting of the packages on a route for any reason can also be taken into account.

Both in the system shown in FIG. 1 and in the system shown in FIG. 4, it would be possible for a package to be visually altered in a specific manner after the registration feature value vectors for said package have been generated and before said package has been put into the cargo space of a delivery vehicle. By way of example, it is thus possible for a label to be applied at a particular point on a surface of the package. In order to take account of a systematically performed visual alteration of this kind, the registration feature value vectors and/or the identification feature value vectors for the surface in question can be altered by computer prior to a comparison. For exemplary details regarding a computation method of this kind, reference is made to the document EP 2 371 461 A1.

The illustrated or described connections between components are intended to be understood to be functional connections. They can be provided directly or indirectly via a plurality of other components. The sequence of the outlined actions in the individual flowcharts is not imperative; alternative sequences for the method steps are conceivable. The actions can be implemented in different ways; thus, implementation not only in software (by program instructions) but also just in hardware or in a combination of the two is conceivable.

It goes without saying that the embodiments described are merely examples that can be modified and/or augmented in a wide variety of ways within the context of the claims. In particular, any feature that has been described for a particular exemplary embodiment can be used independently or in combination with other features in any other exemplary embodiment. Any feature that has been described for an exemplary embodiment in a particular category can also be used in corresponding fashion in an exemplary embodiment in another category.

The invention claimed is:

1. A method for transporting a plurality of cuboidal items to prescribed destinations, wherein, for at least one item being a cuboidal item to be transported, performing the following steps of:
producing at least one computer-evaluable depiction of the item to be transported, the computer-evaluable depiction showing at least one surface of the item;
ascertaining, via automatic image evaluation of the computer-evaluable depiction, for at least one of a plurality of prescribed visually detectable features, what identification feature value a feature assumes for the computer-evaluable depiction of the item;
automatically comparing an identification feature value vector produced by the automatic image evaluation of the computer-evaluable depiction of the item with stored registration feature value vectors, the stored registration feature value vectors used for the comparing belong to data records from the plurality cuboidal of items, wherein a data record for a respective item contains six registration feature value vectors and wherein each of the six registration feature value vectors indicates a value for each prescribed visually detectable feature for a respective one of six surfaces of the item; and
generating a message if the identification feature value vector matches a stored registration feature value vector with sufficient accuracy, wherein the message contains a piece of information about the item to which the data record with the stored registration feature value vector recognized as matching belongs, and the message can be used for a further transport of the item.

2. The method according to claim 1, which further comprises:
carrying out the method in a cargo space of a delivery vehicle, wherein the registration feature value vectors used for the comparing step belong to the data records from the plurality of cuboidal items that have been put into the cargo space, or carried out in a buffer store, wherein the registration feature value vectors used for the comparing step belong to the data records from the plurality of cuboidal items that are in the buffer store.

3. The method according to claim 1, wherein during transport, passing each of the cuboidal items to be transported through an image recording station beforehand at least once, wherein, for each of the cuboidal items to be transported, performing the further steps:
producing automatically, via the image recording station, a respective computer-evaluable depiction of each surface of the cuboidal item passing through, that is to say a total of six depictions;
performing an automatic image evaluation of each of the computer-evaluable depictions to ascertain, for each of the surfaces of the item and for each said prescribed visually detectable feature, what value the feature assumes for the surface, so that a total of six registration feature value vectors are produced for the cuboidal item; and
producing a data record for the item and storing the data record of the item in a data memory, wherein the data record contains the six registration feature value vectors.

4. The method according to claim 3, wherein:
the image recording station belongs to a fixed sorting installation, the fixed sorting installation sorts the items to be transported on a basis of a destination; and
the at least one computer-evaluable depiction of the item for producing an identification feature value vector is produced by a mobile data-processing appliance.

5. The method according to claim 4, wherein:
the mobile data-processing appliance has a data memory; and
the at least one computer-evaluable depiction of the item for producing the identification feature value vector is produced in a cargo space in a delivery vehicle, and the registration feature value vector for the item that is put into the cargo space of the delivery vehicle is transmitted to the mobile data-processing appliance and stored in the data memory of the mobile data-processing appliance.

6. The method according to claim 3, wherein for each of the items performing the additional steps of:
prescribing a respective destination to which the item is to be transported;
ascertaining a prescribed destination, via the image recording station, by evaluating the computer-evaluable depictions of the item;
storing a coding for an ascertained destination in the data record for the item; and
providing the message produced about the item with a flag for the stored destination.

7. The method according to claim 1, wherein at least one of the following features belongs to the prescribed visually detectable features:
a color value or grayscale value for the surface;
a contour of the surface of the item that is shown in the computer-evaluable depiction;
a situation, a size, an orientation, a color value or grayscale value of a region of the surface that differs visually from a remainder of the surface; and
a reflection behavior or a surface condition of the surface.

8. The method according to claim 1, wherein:
each said data record for the item to be transported contains a coding for a destination to which the item is to be transported; and
the message generated about the item contains a flag for the destination to which the item is to be transported, the flag is generated from destination coding in the data record.

9. The method according to claim 1, wherein:
the at least one computer-evaluable depiction for producing the identification feature value vector is produced in a cargo space in a delivery vehicle;
a measurement is taken at least once to determine a geographical location at which the delivery vehicle is currently located;
information about the item that belongs to the message produced contains a piece of removal information about whether or not the item is to be removed from the delivery vehicle at a current location; and
the piece of removal information is output in a form that can be perceived by a human being.

10. The method according to claim 1, which further comprises:
producing computer-evaluable depictions of items for producing the identification feature value vectors via a mobile appliance in a cargo space in a delivery vehicle;
transmitting the computer-evaluable depictions to an image evaluation unit that is physically separate from the mobile appliance by the mobile appliance, the image evaluation unit performing the further steps of:
producing the identification feature value vectors;
comparing the identification feature value vectors with stored registration feature value vectors;
producing an initial message via the image evaluation unit;
transmitting the initial message produced to the mobile appliance; and
generating the message with information about the item by using the initial message transmitted from the image evaluation unit.

11. The method according to claim 1, which further comprises:
producing the at least one computer-evaluable depiction for producing the identification feature value vector in a cargo space in a delivery vehicle;
during transport, the at least one item is removed from the cargo space at least once; and
comparing the identification feature value vector from the item in the cargo space exclusively with the registration feature value vectors from the items as are still in the cargo space at an instant of a comparison.

12. The method according to claim 1, which further comprises:
putting each of the items to be transported first of all into a buffer store and from there into a cargo space in a delivery vehicle;
producing the at least one computer-evaluable depiction for producing the identification feature value vector in a cargo space in a delivery vehicle and the registration feature value vectors used for a comparison belong to the data records from the plurality of cuboidal items that have been put into the cargo space, and in that, for at least the one item to be transported in the buffer store, the following steps are additionally performed:
additionally, at least once, producing at least one further computer-evaluable depiction of the item while the item is in the buffer store;
performing an automatic image evaluation of the further computer-evaluable depiction of the item in the buffer store to produce a further identification feature value vector;
comparing the further identification feature value vector with stored registration feature value vectors, the stored registration feature value vectors used for the comparing belong to data records from the cuboidal items that are in the buffer store; and
generating a further message if the identification feature value vector matches a stored registration feature value vector with sufficient accuracy, the further message containing a piece of information about the item to which the data record for the stored registration feature value vector recognized as matching belongs, and the further message can be used to load the cargo space of the delivery vehicle.

13. The method according to claim 1, wherein the stored registration feature value vectors satisfy at least one of the following conditions:
the stored registration feature value vectors contain only registration feature value vectors for items that have been put into a vehicle or a temporary store according to schedule;
the stored registration feature value vectors contain only registration feature value vectors for items that have been put into the vehicle or the temporary store according to a user input;
the stored registration feature value vectors contain only registration feature value vectors for the cuboidal items that are intended to be delivered on a route to be taken by the vehicle and on at least one adjacent route according to schedule;
the stored registration feature value vectors are each reduced by registration feature value vectors for the items that have been removed from the vehicle or a temporary store finally on the basis of a user input;
each stored registration feature value vector is linked to a stored statement regarding the vehicle or the temporary store that contains an associated item according to schedule, wherein only the stored registration feature value vectors for the cuboidal items that are in the vehicle or the temporary store according to schedule are taken into account for the comparison;
each stored registration feature value vector is linked to a stored statement regarding a route on which an associated item is intended to be delivered according to schedule, wherein only the stored registration feature value vectors for the cuboidal items that are intended to be delivered on a prescribed route or on an adjacent route according to schedule are taken into account for the comparison;
each stored registration feature value vector can be linked to a stored statement that the associated item has been removed from the vehicle or the temporary store finally, wherein only stored registration feature value vectors for items that are not linked to such a statement are taken into account for the comparison; and
each stored registration feature value vector is linked to a stored statement regarding the destination at which the associated item is intended to be delivered according to schedule, wherein only the stored registration feature value vectors for the cuboidal items that, according to the stored statement, are intended to be delivered within a prescribed radius around a current position of a vehicle and/or around a scheduled route of a vehicle are taken into account for the comparison.

14. A system for controlling a method for transporting a plurality of cuboidal items to prescribed destinations, the system comprising:
an image recorder configured to produce at least one computer-evaluable depiction of an item to be transported, at least once;
an identification image evaluation processor configured to ascertain, by means of automatic image evaluation of the computer-evaluable depiction of the item, for at least one of a plurality of prescribed visual features, what value a feature assumes for the computer-evaluable depiction of the item, and to automatically compare an identification feature value vector produced by the automatic image evaluation of the computer-evaluable depiction of the item with stored registration feature value vectors, wherein the stored registration feature value vectors used for a comparison belong to data records from the cuboidal items, wherein a data record for a respective item contains six registration feature value vectors and wherein each of the six registration feature value vectors indicates a value for each prescribed visually detectable feature for a respective one of six surfaces of the item; and
a message generation appliance configured so that, if the identification feature value vector matches a stored registration feature value vector with sufficient accuracy, said message generation appliance generating a message that contains a piece of information about the item to which the data record with the stored registration feature value vector recognized as matching belongs.

15. The system according to claim 14, wherein said image recorder produces the at least one computer-evaluable depiction of the item to be transported, at least once, while the item is in a cargo space in a delivery vehicle, wherein the registration feature value vectors used for the comparison belong to the data records from the plurality of cudoidal items that have been put into the cargo space, or while the item is in a buffer store, wherein the registration feature value vectors used for the comparison belong to the data records from the plurality of cuboidal items that are in the buffer store.

16. The system according to claim 14, further comprising:
an image recording station that is passed through at least once by each of the cuboidal items to be transported during transport and configured to automatically produce a respective computer-evaluable depiction of each surface of each cuboidal item to be transported, that is to say a total of six depictions of the item; and
a registration image evaluater is connected to said image recording station and configured to automatically ascertain, by means of automatic image evaluation of a corresponding depiction, for each surface of the item to be transported and for each prescribed visually detectable feature, what value the feature assumes for the surface, so that a total of six registration feature value vectors are produced for a cuboidal item, and additionally configured to produce a data record for an item to be transported and to store the data record in a data memory, wherein the data record contains the six registration feature value vectors.

17. A program containing non-transitory computer executable program instructions, wherein the program instructions, when executed by a processor, prompt an apparatus to carry out the following steps:
receive image data from at least one depiction produced for a cuboidal item;
create an identification feature value vector from at least one value of at least one feature using the image data, the at least one feature represents a visually detectable property of a surface of a cuboidal item;
compare the identification feature value vector created with stored registration feature value vectors, the stored registration feature value vectors are stored for a plurality of cuboidal items and wherein, for each cuboidal item, a respective registration feature value vector is stored for each of six different surfaces of the cuboidal item; and
prompt an output of a message on a basis of a stored statement linked to the registration feature value vector found if a stored registration feature value vector with a prescribed degree of match with the created identification feature value vector is found in the comparing step, wherein the message can be used for the further transport of the item.

18. A non-transitory computer-readable storage medium storing a program having computer executable instructions, the program instructions, when executed by a processor, prompt an apparatus to carry out the following steps of:
receive image data from at least one depiction produced for a cuboidal item;
create an identification feature value vector from at least one value of at least one feature using the image data, wherein the at least one feature represents a visually detectable property of a surface of a cuboidal item;
compare the identification feature value vector created with stored registration feature value vectors, wherein the registration feature value vectors are stored for a plurality of cuboidal items and wherein, for each cuboidal item, a respective registration feature value vector is stored for each of six different surfaces of the cuboidal item; and
prompt an output of a message on a basis of a stored statement linked to the registration feature value vector found if a stored registration feature value vector with a prescribed degree of match with the created identification feature value vector is found in the comparing step, wherein the message can be used for the further transport of the item.

* * * * *